the reaction a steady evolution of hydrogen halide occurs.
2,870,157

2,2'-DITHIOBISBENZOTHIAZOLE AND 2-MERCAPTOBENZOTHIAZOLE ZnCl₂ AND CdCl₂ COMPLEXES

Ernest Csendes, Wilmington, Del., assignor to E. I. du Pont de Nemours and Company, Wilmington, Del., a corporation of Delaware No Drawing. Application July 26, 1957
Serial No. 674,313

4 Claims.  (Cl. 260—299)

This invention is directed to new compositions of matter containing both zinc and cadmium halides in a single complex. These complexes are exceptionally useful accelerators for the vulcanization of sulfur-curable polyurethane elastomers.

Polyurethane polymers having side chains containing C=C curing sites which are vulcanized by sulfur have been found to possess properties which are much superior to those exhibited by products which are obtained from polyurethane polymers having recurring urea groups in the chain which have been cured by using organic diisocyanates. However, considerable difficulty has been encountered in exploiting these side chain C=C curing sites because they are not affected satisfactorily by the conventional sulfur curing systems which are used for natural rubber, GR-S, and neoprene. The curing cycle requires more time than is permissible for a commercial curing process.

It is therefore an object of the present invention to provide novel complexes which will accelerate the sulfur-curing of polyurethane elastomers containing side chains with —CH=CH₂ cure sites.

This and other objects will become apparent in the following description and claims.

More specifically, the present invention is directed to compounds of the structure

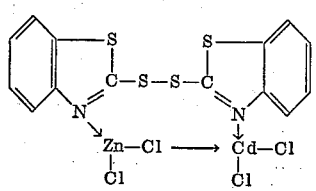

(I)

and

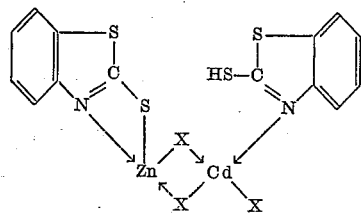

(II)

where the X's are Cl, Br, or I and need not be the same.

The zinc chloride:cadmium chloride:2,2'-dithiobisbenzothiazole complex (I) is prepared by agitating a slurry of a zinc chloride:2,2'-dithiobisbenzothiazole complex in o-xylene with a molar equivalent of cadmium chloride for about 10 hours at the reflux temperature of the mixture. At the end of this time cooling is applied and the precipitated complex is collected and dried.

Complex (II) is prepared by agitating a slurry of a zinc halide:2-mercaptobenzothiazole complex in o-xylene with a molar equivalent of cadmium halide for about 10 hours at the reflux temperature of the mixture. During the reaction a steady evolution of hydrogen halide occurs. It is believed that the following reaction takes place:

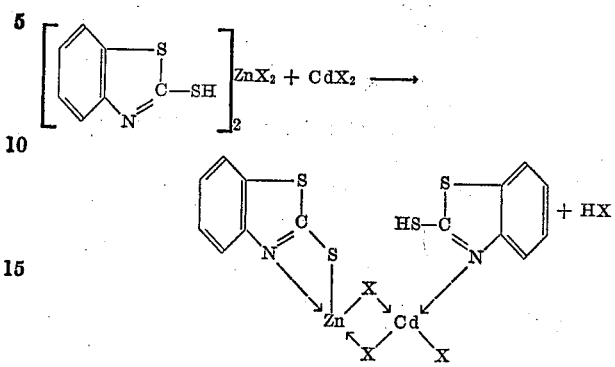

When cadmium chloride is reacted with the zinc chloride complex of 2-mercaptobenzothiazole, hydrogen chloride is evolved. When cadmium bromide is substituted for cadmium chloride, hydrogen bromide is given off. When cadmium bromide is reacted with the zinc iodide complex of 2-mercaptobenzothiazole, the vapor of iodine is observed. Any chloride, bromide, or iodide of zinc or cadmium may be used.

The novel complexes of the present invention are prepared in an inert medium under abrading conditions of agitation. The solvent may be any hydrocarbon which is inert toward both the reactants and the product complex and which boils above about 100° C. (760 mm.). o-Xylene is preferred. The agitation under abrading conditions in the presence of the inert medium provides for intimate contact between the components taking part in the new complex formation and disperses the complex which is formed. The abrading conditions are conveniently attained by the addition of glass beads to the inert medium. As these glass beads are agitated, such as by mechanical stirring, the action of the moving glass beads on the crystals of the insoluble components produces a finer state of subdivision and continually renews fresh surface for new complex formation.

It is desirable that the reaction vessel in which the complex is formed has a glass or enamel, rather than a metal liner, in order to obviate the possibility of the zinc halide reacting with the metal surface.

The temperature at which the reactions are run will determine the time needed for completion. Ten hours at about 140° C. is adequate. The use of a lower temperature will require a longer reaction time.

The complexes of the present invention are high-melting, free-flowing powders which are substantially non-hygroscopic. The X-ray diffraction patterns of both complexes (I) and (II) show the absence of free cadmium halide.

The instant novel complexes are very useful as compounding ingredients in the sulfur-curing of polyurethane polymers having side chains containing aliphatic C=C groups. Example 5 illustrates this utility.

The sulfur-curable polyurethane polymers whose vulcanization is accelerated by the novel complexes of the present case may be conveniently prepared from a high molecular weight polyalkyleneether glycol, such as a polytetramethyleneether glycol, an organic diisocyanate such as toluene-2,4-diisocyanate, and a low molecular weight, non-polymeric glycol such as 3-allyloxy-1,2-propanediol.

The use of the novel complexes of the present invention in a sulfur-curing process will be more particularly illustrated in the following examples; however, the invention is not intended to be limited to these examples. Parts are by weight unless otherwise indicated. In these examples the following symbols are used:

MBTS—refers to 2,2'-dithiobisbenzothiazole, also known as benzothiazyl disulfide
MBT—refers to 2-mercaptobenzothiazole
ZnMBT—refers to

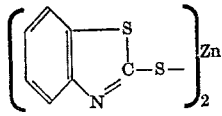

The following ASTM procedures are used for the tests carried out in Example 5.

Yerzley resilience—D945–55
Compression set—D395–53T (Method B, 22 hrs. 70° C.)

The stress-strain properties are determined using a Williams ring tester.

EXAMPLE 1

*Preparation of the ZnCl₂:MBTS:CdCl₂ complex*

7.84 parts of $ZnCl_2$:MBTS complex is slurried by agitation with 130 parts of o-xylene in an enamel-lined reaction vessel equipped with a condenser and drying tube. Glass beads are provided to break up the surface of the complex. The slurry is subsequently agitated at reflux for 10 hours with 3.66 parts of $CdCl_2$. The mixture is cooled and the precipitated solid is collected by filtration. When this material has been dried at 80° C. under vacuum, 10.9 parts of product is finally obtained.

The X-ray diffraction pattern indicates that $CdCl_2$ is absent.

X-ray diffraction studies indicate that low concentrations of $CdCl_2$ can easily be detected in a mixture with $ZnCl_2$:MBTS. For example, it is possible to observe the presence of 10% $CdCl_2$ (by weight of the mixture). X-ray patterns show that no complex is formed when dry $ZnCl_2$:MBTS is heated at 140° C. for 1.5 hours with a molar equivalent of dry $CdCl_2$.

EXAMPLE 2

*Preparation of the* $(MBT)Zn\begin{smallmatrix}Cl\\ \diagdown\\ \diagup\\ Cl\end{smallmatrix}CdCl \cdot MBT$ *complex*

7.84 parts of $ZnCl_2 \cdot 2MBT$ complex is slurried by agitation with 88 parts of o-xylene in an enamel-lined reaction vessel equipped with a condenser and drying tube. Glass beads are provided to break up the surface of the complex. The slurry is subsequently agitated at reflux for 10 hours with 3.66 parts of cadmium chloride. Hydrogen chloride is constantly evolved. Finally the mixture is cooled and the precipitated solid is collected by filtration. When this material has been dried at 80° C. under vacuum, 10 parts of product is obtained.

The X-ray diffraction pattern indicates that both $CdCl_2$ and $Zn(MBT)_2$ are absent; only traces of $ZnCl_2 \cdot 2MBT$ and $ZnCl_2$:MBTS are present.

EXAMPLE 3

*Preparation of the* $(MBT)Zn\begin{smallmatrix}I\\ \diagdown\\ \diagup\\ Br\end{smallmatrix}CdBr \cdot MBT$ *complex*

11.54 parts of $ZnI_2 \cdot 2MBT$ complex is slurried by agitation with 130 parts of o-xylene in an enamel-lined reaction vessel equipped with a condenser and a drying tube. Glass beads are provided to break up the surface of the complex. The slurry is subsequently agitated at reflux with 5.4 parts of powdered $CdBr_2$. Iodine vapor is observed in the condenser. The reactants are stirred at reflux (143° C.) for 16 hours. The mixture is then cooled and filtered. The solids collected are mechanically treated to remove the glass beads. The product is subsequently dried at 80° C. under vacuum.

The X-ray diffraction pattern indicates a disordered structure.

EXAMPLE 4

*Preparation of the* $(MBT)Zn\begin{smallmatrix}Cl\\ \diagdown\\ \diagup\\ Cl\end{smallmatrix}CdBr \cdot MBT$ *complex*

7.84 parts of $ZnCl_2 \cdot 2MBT$ complex is reacted with 3.66 parts of $CdBr_2$ by the same procedure given in Example 3. Hydogen bromide is continually evolved during the run.

The X-ray diffraction pattern indicates a disordered structure.

EXAMPLE 5

A. *Preparation of polymer A*

3 moles of toluene-2,4-diisocyanate is added to 1 mole of 3-(allyloxy)-1,2-propanediol and the mixture is agitated for 3 hours at 80° C. under an atmosphere of nitrogen. To this mixture is added 2 moles of polytetramethyleneether glycol of molecular weight 1000 and the mass is agitated at 80° C. for 1 hour. It is then transferred to a polyethylene-lined container and heated in an oven at 80° C. for 72 hours. A rubbery polymer is obtained which has an average of one side chain allyloxy group for each 2650 units of molecular weight.

B. *Compounding of the elastomer*

Three stocks 5B–1, 5B–2, 5B–3 are compounded on a rubber roll mill. They all contain 100 parts of polymer A, 30 parts of high abrasion furnace black and 1 part of sulfur. Each of these stocks contains additional components. These agents and their concentrations (parts are by weight based on 100 parts of polymer A) are given in Table I, which follows:

TABLE I.—CURING ADDITIVES

| Additional Components | Stock | | |
|---|---|---|---|
| | 5 B–1 | 5 B–2 | 5 B–3 |
| MBT | 1 | 0.48 | 0.48 |
| MBTS | 3.52 | 4.00 | 4.00 |
| ZnCl₂:CdCl₂·MBTS | 1.00 | | |
| (MBT)Zn(Cl)(Cl)CdCl·MBT | | 0.80 | |
| (MBT)Zn(I)(Br)CdBr·MBT | | | 1.77 |

C. *Curing the elastomer*

The compounded stocks are cured in a press at 150° C. for 20 minutes. The properties of the vulcanizates obtained are given in Table II which follows.

TABLE II.—VULCANIZATE PROPERTIES

| Property | Stock | | |
|---|---|---|---|
| | 5 B–1 | 5 B–2 | 5 B–3 |
| M₃₀₀ (p. s. i.) at 25° C | 2,900 | 2,400 | 3,100 |
| T_B (p. s. i.) at 25° C | 5,000 | 4,650 | 4,700 |
| E_B (percent) at 25° C | 420 | 430 | 390 |
| Comp. Set (percent) at 70° C | 35 | 37 | 27 |
| Yerzley (percent) | 67 | 66 | 68 |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

I claim:
1. A compound taken from the group consisting of
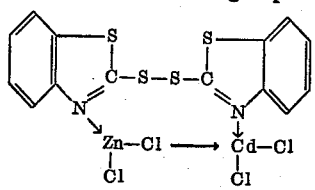
(I)
and
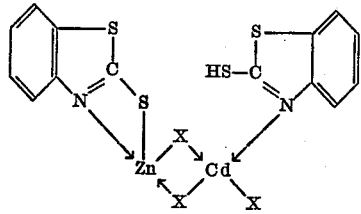
(II)
wherein X is a member selected from the group consisting of chlorine, bromine and iodine.
2. The compound
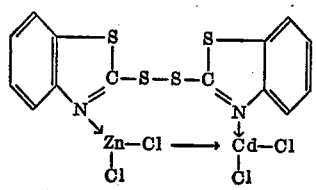
3. The compound
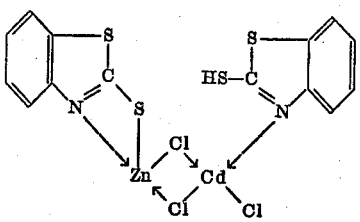
4. The compound
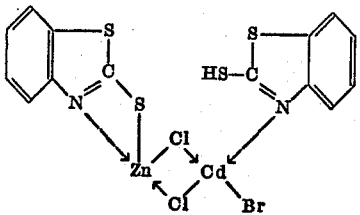
No references cited.